(12) United States Patent (10) Patent No.: US 9,836,341 B2
Hammerschmidt et al. (45) Date of Patent: *Dec. 5, 2017

(54) SYSTEM AND METHOD FOR BIT ERROR RATE MONITORING

(71) Applicant: Infineon Technologies AG, Neubiberg (DE)

(72) Inventors: Dirk Hammerschmidt, Villach (AT); Timo Dittfeld, Munich (DE)

(73) Assignee: Infineon Technologies AG, Neubiberg (DE)

( * ) Notice: Subject to any disclaimer, the term of this patent is extended or adjusted under 35 U.S.C. 154(b) by 377 days.

This patent is subject to a terminal disclaimer.

(21) Appl. No.: 14/307,029

(22) Filed: Jun. 17, 2014

(65) Prior Publication Data

US 2014/0298110 A1 Oct. 2, 2014

Related U.S. Application Data

(63) Continuation of application No. 13/049,209, filed on Mar. 16, 2011, now Pat. No. 8,775,029.

(51) Int. Cl.
  *B60R 22/00* (2006.01)
  *G06F 11/07* (2006.01)
  *H04L 1/00* (2006.01)
  *H04L 1/20* (2006.01)

(52) U.S. Cl.
  CPC .......... *G06F 11/076* (2013.01); *H04L 1/0061* (2013.01); *H04L 1/201* (2013.01); *H04L 1/203* (2013.01)

(58) Field of Classification Search
  CPC .............................. G06F 11/076; H04L 1/0061
  See application file for complete search history.

(56) References Cited

U.S. PATENT DOCUMENTS

| | | |
|---|---|---|
| 6,643,818 B1 | 11/2003 | Valk |
| 8,091,416 B2 | 1/2012 | Wang et al. |
| 2003/0228005 A1* | 12/2003 | Melick ................. H04B 1/7172 379/93.01 |
| 2005/0073929 A1* | 4/2005 | Mutou ............... G11B 20/1816 369/53.35 |

(Continued)

FOREIGN PATENT DOCUMENTS

CN 101798947 A 8/2010

OTHER PUBLICATIONS

"Road vehicles—Functional safety—Part 5: Product development at the hardware level," Dec. 4, 2010, 81 pages, ISO/TC 22/SC 3 BL19, see, for example, Table D1 (last line: data transmission) and Table 8.

(Continued)

*Primary Examiner* — Adam Alharbi
(74) *Attorney, Agent, or Firm* — Slater Matsil, LLP (57) ABSTRACT

In an embodiment, a method of determining whether to trigger an event based on data blocks having status data includes electronically receiving the data blocks over a channel, performing a data integrity check on the data blocks to determine whether a particular data block has a transmission fault, calculating a received error metric based on performing the data integrity check, and disabling an event trigger if the received error metric crosses a first error threshold.

19 Claims, 8 Drawing Sheets

(56) References Cited

U.S. PATENT DOCUMENTS

| | | | | |
|---|---|---|---|---|
| 2010/0180576 A1* | 7/2010 | Wang | ............... | F01N 3/2066 |
| | | | | 60/276 |
| 2011/0044454 A1 | 2/2011 | Baek et al. | | |
| 2011/0078512 A1 | 3/2011 | Grube et al. | | |
| 2013/0145236 A1* | 6/2013 | Baker | ............. | H03M 13/116 |
| | | | | 714/776 |
| 2014/0219506 A1* | 8/2014 | Foltin | ............ | G06K 9/00825 |
| | | | | 382/104 |

OTHER PUBLICATIONS

"Road vehicles—Functional safety—Part 6: Product development: software level," Dec. 4, 2010, 49 pages, ISO/TC 22/SC 3 BL 19, see for example, Annex D, Table 1, part 5.

* cited by examiner

SYSTEM AND METHOD FOR BIT ERROR RATE MONITORING

This is a continuation application of U.S. application Ser. No. 13/049,209, entitled "System and Method for Bit Error Rate Monitoring," which was filed on Mar. 16, 2011, (now U.S. Pat. No. 8,775,029, Issued Jul. 8, 2014), which application is hereby incorporated herein by reference in its entirety.

TECHNICAL FIELD

This invention relates generally to circuits and systems, and more particularly to a system and method for bit error rate monitoring.

BACKGROUND

Airbag supplemental restraint systems (SRS) have become increasingly pervasive because of their ability to protect vehicle occupants from serious injury in the event of a collision. A typical airbag system has an airbag, an inflation device, and a crash sensor that detects a sudden deceleration of the vehicle. In order to prevent accidental or unwanted airbag inflation, airbag systems generally require a high safety integrity level to prevent accidental or unwanted airbag inflation. One way to maintain a high safety integrity level is to use multiple sensors. For example, a typical side impact airbag system has a pressure sensor inside a car door, and an accelerometer located in a pillar next to the car door. If the pressure sensor measures a sudden rise in pressure at the same time the accelerometer detects an acceleration, the SRS system deploys the side impact airbag. By setting proper timing and amplitude conditions for the pressure sensor and accelerometer, the airbag is deployed in the event of a collision, but not from a vibration caused by a person closing the door, for example.

Another important issue regarding SRS systems is maintaining a high level of signal integrity with respect to the sensor data transmission channel. In some SRS systems, crash sensors that are remotely located in various portions of the vehicle are coupled to controller via a digital interface. In order to maintain a high safety integrity level with respect to the transmitted sensor data, various data error detection measures are used to prevent airbag deployment in the presence of noise and disturbance to the sensor data lines.

SUMMARY OF THE INVENTION

In an embodiment, a method of determining whether to trigger an event based on data blocks having status data includes electronically receiving the data blocks over a channel, performing a data integrity check on the data blocks to determine whether a particular data block has a transmission fault, calculating a received error metric based on performing the data integrity check, and disabling an event trigger if the received error metric crosses a first error threshold.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely an airbag deployment system. The invention may also be applied, however, to other systems that reliably determine whether to trigger an event based on incoming data.

In an automotive safety system, such as an airbag system, transmitted sensor data is validated using data error detection techniques, such as CRC checking, to make sure that there are no data errors that could mistakenly activate a triggered safety measure, such as an airbag deployment. In order to maintain a high safety integrity level under high error conditions, detected data errors are monitored to determine a received error metric. If the received error metric exceeds a threshold, the triggered safety measure is disabled. In some embodiments, a high safety integrity level is maintained even under error conditions in which an implemented data error detection technique has an elevated probability of not detecting a data error.

Figure 1:
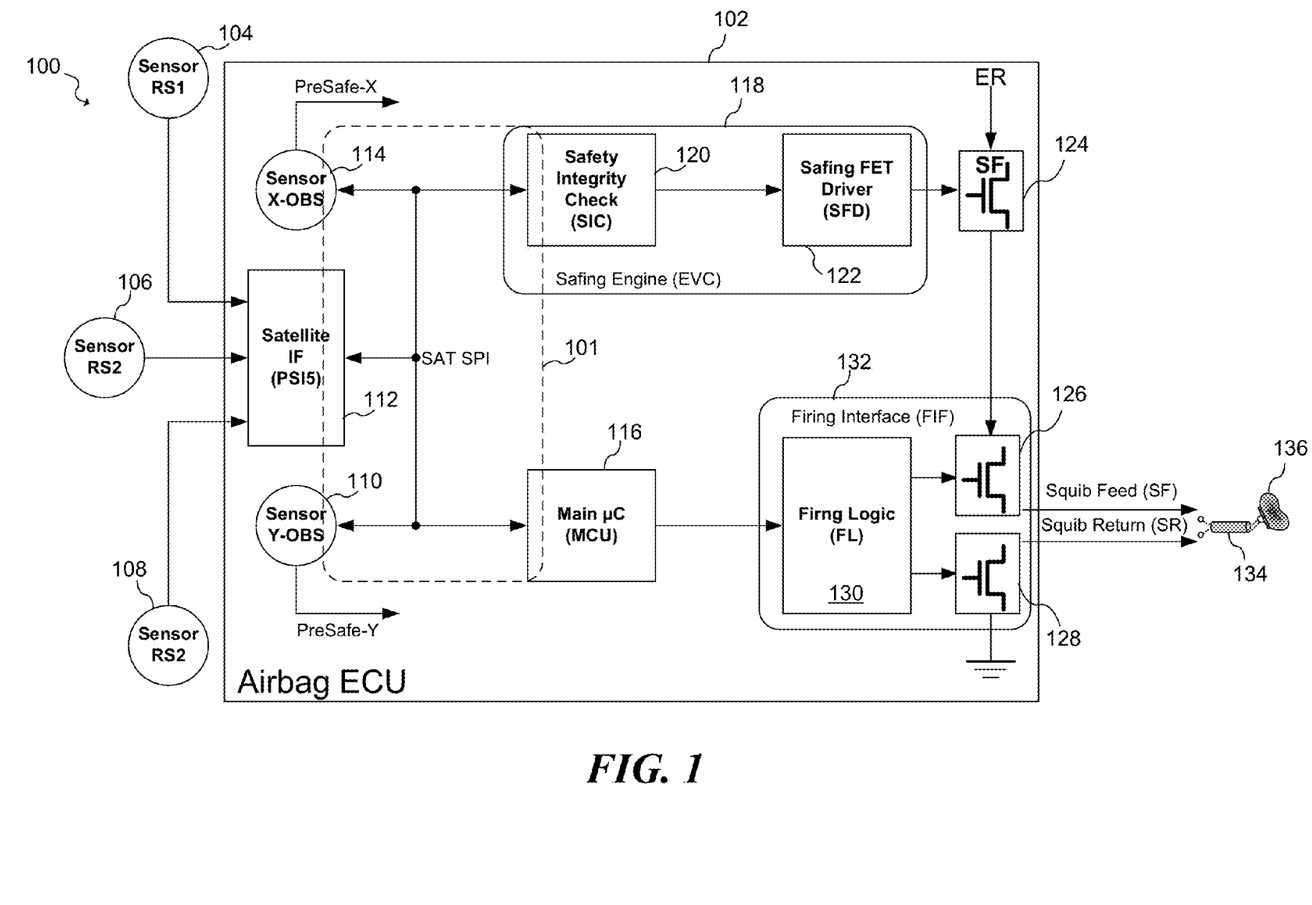
FIG. 1 illustrates an embodiment airbag system.

FIG. 1 illustrates embodiment airbag system 100 having remote sensors 104, 106 and 108 that are monitored by electronic control unit (ECU) 102. During airbag deployment, firing interface 132 within ECU 102 activates squib 134, which triggers the inflation of airbag 136. In an embodiment, remote sensors 104, 106 and 108 are located remotely from safing engine 118 and microcontroller 116. For example, remote sensors 104, 106 and 108 may be located in doors and portions of the automotive frame at some distance from airbag control circuitry. In some embodiments, each sensor 104, 106 and 108 has a 2-wire sensor interface, such as a PSI5 or a DSI interface that use receiver integrated circuits (ICs) to supply the sensors with power and to demodulate the received data.

In an embodiment, satellite interface 112 appends a data integrity field, such as a CRC field to sensor data before transmitting the data via SPI bus 101. Alternatively, other data integrity checking techniques can be used besides CRC, and other bus interface protocols can be used besides SPI, such as using a parity bit and/or using a Hamming code. In an embodiment, the SPI bus is on the ECU board, therefore its length can be limited to a distance of approximately 10 cm. In such an embodiment, long wires are partitioned to a peripheral sensor interface (PSI) or a digital signal interface (DSI). In some embodiments, however, the SPI can have several branches on the PCB, as it not only couples a microcontroller to a satellite receiver, but it also addresses on-board sensors, such as accelerometers mounted on the PCB.

In an embodiment, on board sensors 110 and 114 and are also coupled to SPI bus 101, and are used, for example to cross check data from remote sensors 104, 106 and 108. For example, in one embodiment, on board sensors 110 and 114 sense acceleration in airbag ECU 102. In an embodiment, on board sensors 110 and 114 also generate presafe signals PreSafe-Y and PreSafe-X, respectively, which are communicated to the microcontroller or an event verification unit (EVU) via a communication channel independent of SPI interface 101 in order to prevent airbag deployment. The EVU can be implemented, for example, as a controller or a state machine. In an alternative embodiment, on-board sensors 110 and 114 are coupled directly to an A/D in microcontroller 116 rather than through SPI interface 101. In some embodiments, the decision to deploy airbag 136 is made on the basis of data received from remote sensors only, for example, in the case of side impact airbags.

In order to maintain a high level of signal integrity, sensors 104, 106 and 108 are coupled to satellite interface 112, which relays sensor data via SPI bus 101. In this case, the communication over this SPI channel is configured to fulfill high safety integrity requirements to provide a sufficient safety margin under worst case distortion conditions that would otherwise significantly increase the probability of a received bit error. Such conditions can include, but are not limited to faults as strong EMC injection, broken wires and cold solder connections on the PCB.

In an embodiment, microcontroller 116 receives sensor data from SPI bus 101 and determines whether airbag 136 needs to be deployed based on sensor data. Microcontroller 116 signals firing logic 130 within firing interface 132, which provides activation signals at the gates of squib line drivers 126 and 128. Squib line driver 126 sources current to squib 134 via squib feed signal SF, and squib line driver 128 sinks current from squib 124 via squib return signal SR.

Safing engine 118 performs a data integrity check of the sensor data on SPI bus 101 via safety integrity check block 120 using embodiment data validation techniques. If safety integrity check block 120 determines that the SPI sensor interface is providing valid data with a sufficiently low data error probability, safing fet driver 122 may arm firing interface 132 by activating safing driver 124 coupled in series with power supply ER and squib line drivers 126 and 128. These valid data represent acceleration or pressure signals that could be caused by a crash, for example, in a situation in where the safing FET is not activated by a sensor signal. Such a situation can be detected by a sequence of messages that show low activity emanating from the accelerometers or from in door pressure sensors. If, on the other hand, safety integrity check block 120 determines that the SPI sensor interface is not providing valid data with a sufficiently low data error probability, safing driver 122 is shut off, thereby disabling squib line drivers 126 and 128 and preventing airbag deployment.

It should be appreciated that the embodiment of FIG. 1 is one illustrative embodiment of an automotive safety system. In alternative embodiments, greater or fewer sensors can be interfaced to one or more airbags via one or more satellite interfaces. Furthermore, other safing systems and squib deployment configurations systems can be used in alternative embodiments. For example, redundant or diverse calculations in a dual core microcontroller can be monitored by an independent signature watchdog that is configured to disable airbag deployments using, for example, a safing switch. In further embodiments, ECU 102 can be used to trigger and deploy other safety systems such as belt pretensioners.

In an embodiment, an airbag system performs according to a safety standard, such as ISO 26262 Automotive Safety Integrity Level Standard (ASIL) D. According to the ASIL standard, the overall safety system is required to have a failure rate of less than $10^{-8}$. In one embodiment, the overall failure rate is maintained below this level by allocating a lower expected failure rate to component parts. For example, in one embodiment, a target error rate of $10^{-10}$ is used, which is 100 times lower than the overall allowable failure rate of $10^{-8}$. It should be appreciated that this described error budget constitutes just one example embodiment. In alternative embodiments, other standards besides ASIL D can be used, and other error budget allocations can be used depending on the particular system, specification and implementation.

Figure 2:
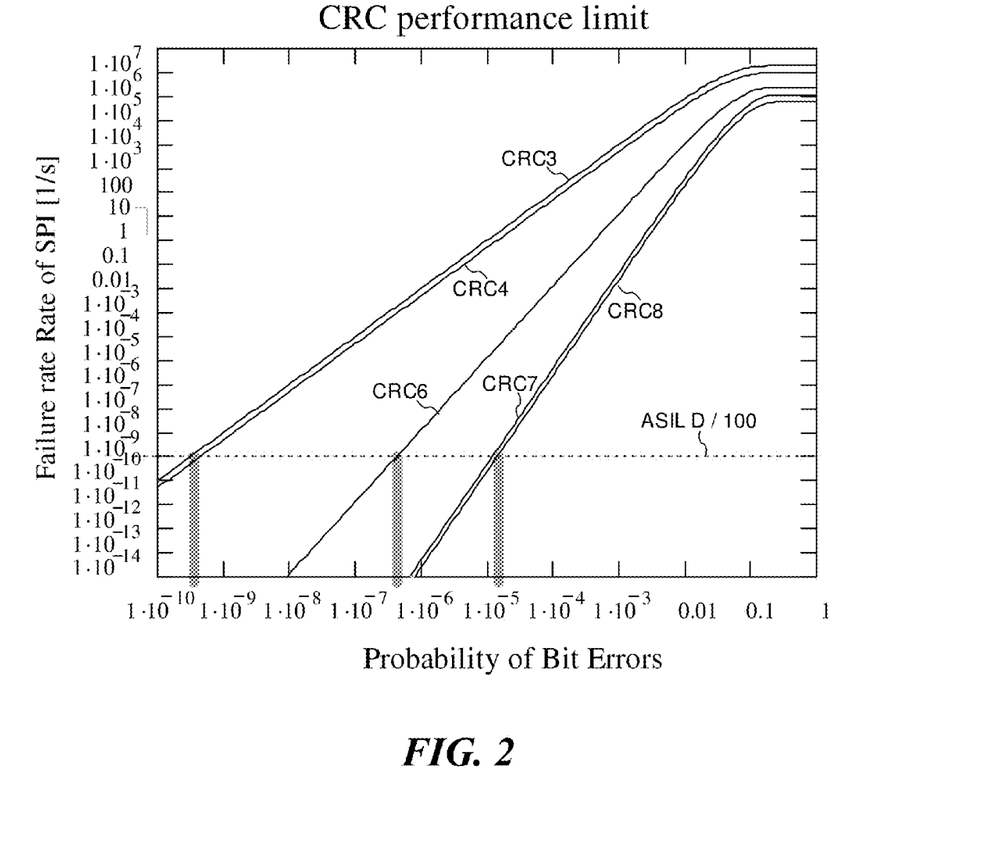
FIG. 2 illustrates an embodiment cyclic redundancy check (CRC) performance limit graph showing a failure rate of a serial peripheral interface (SPI) bus with respect to bit error probability.

FIG. 2 illustrates a CRC performance limit graph that shows the failure rate of an embodiment SPI bus with respect to the probability of random and independent bit errors for a variety of CRC polynomial lengths. Here, the failure rate represents the failure of the CRC algorithm to detect erroneous 32 bit frames for an embodiment side airbag system using 2 satellite sensors each delivering, for examples, samples every 500 µs, which results in a data rate of 2*2000*32 Bit/s=128 kBit/s. The graph also shows a dashed line representing an embodiment rate target of $10^{-10}$, which is 100 times lower than the ASIL D overall allowable failure rate of 10-8. Curves CRC3, CRC4, CRC6, CRC7 and CRC8 represent the performance of CRC polynomial with bit lengths of 3, 4, 6, 7 and 8 bits, respectively. It can be seen that for 3 and 4 bit CRC polynomials, the probability of bit errors needs to be below about $3 \times 10^{-10}$ to achieve the embodiment target frame failure rate of $10^{-10}$. In some automotive embodiments, this bit error rate may be difficult to achieve in conditions where the SPI interface wire is faulty due to a capacitively coupled signal caused by a broken wire or a cold solder joint, or in conditions where the SPI interface is affected by electronic interference emanating from automotive systems and other sources, such as mobile phones. For a 6 bit CRC polynomial, the probability of bit errors needs to be below about $3 \times 10^{-7}$, and for 7 and 8 bit CRC polynomials, the probability of bit errors needs to be below about $1 \times 10^{-5}$ to achieve the embodiment target of a $10^{-10}$ frame failure rate. As the length of the CRC polynomial increases, however, the frame length increases and the amount of data bandwidth available for data decreases.

In an embodiment, the failure rate of detecting transmission errors can be reduced by making an airbag firing decision based on multiple sensor measurements rather than a single sensor measurement. In addition to using a CRC to detect errors in each sample, a decision algorithm is used that tolerates a certain number of transmission errors. In an embodiment, a tradeoff is made between the length of the CRC polynomial and the strength of the decision algorithm. For example, as the length of the CRC polynomial is made shorter, the number of tolerable errors in the decision algorithm is increased. In one embodiment, this tradeoff is determined by calculating how many failed transmissions the decision algorithm can tolerate in order to get a failure rate of below 10E-10 with respect to a certain CRC polynomial.

In an embodiment, a decision algorithm analyzes 20 sensor samples and decides whether or not to fire an airbag, for example, a side impact airbag, on the basis of these 20 samples. Here, the number of samples was arrived at by noting that a fastest decision time in which to deploy an airbag is 5 ms for a side impact airbag. At a sampling rate of 1/500 μs, 10 sensor data samples can be made during this time. Further, taking into account that there are at least two sensors used to verify a crash, 20 samples are used for a firing decision. In one embodiment, if the decision algorithm can tolerate two faulty samples from each sensor without firing an airbag, the decision algorithm can tolerate up to four undetected transmission faults within 20 messages. In this example, the probability of having greater than four undetected transmission faults within 20 received messages leads to a tolerable probability of an SPI data failure. Alternatively, other airbag times, deployment times, sampling rates, number of data samples used to make a firing decision, an decision algorithm requirements can be used.

Figure 3:
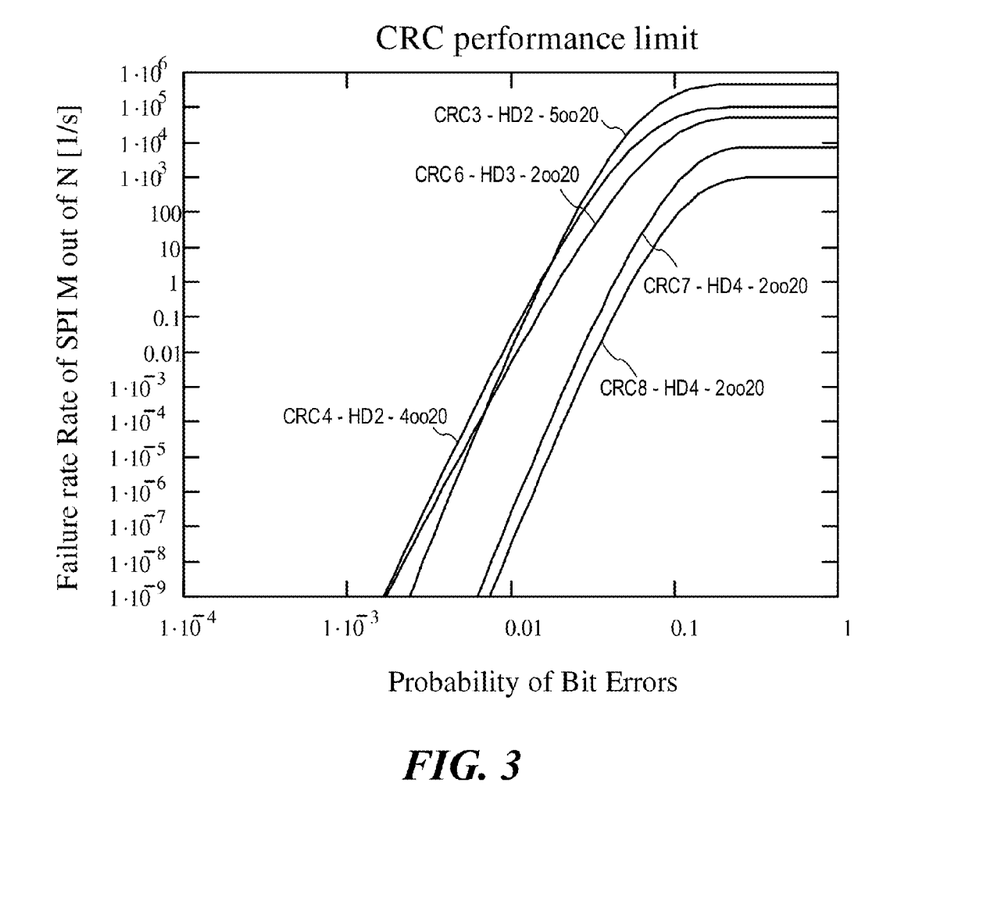
FIG. 3 illustrates an embodiment CRC performance limit graph showing a failure rate of an SPI bus with respect to bit error probability for multiple transmissions.

FIG. 3 illustrates a CRC performance limit graph that shows the failure rate of an embodiment SPI bus that provides 20 repeated sensor transmissions with respect to the probability of bit error for over a variety of CRC polynomial lengths and decision algorithm tolerances. Here, the curves are shown in regions of high bit error probability. Curve CRC3-HD2-5oo20 represents a 3-bit CRC and a transmission algorithm that can tolerate 5 transmission errors; curve CRC4-HD2-4oo20 represents a 4-bit CRC and a transmission algorithm that can tolerate 4 transmission errors; curve CRC6-HD3-2oo20 represents a 6-bit CRC and a transmission algorithm that can tolerate 2 transmission errors; curve CRC7-HD4-2oo20 represents a 7-bit CRC and a transmission algorithm that can tolerate 2 transmission errors; and curve CRC8-HD4-2oo20 represents an 8-bit CRC and a transmission algorithm that can tolerate 2 transmission errors. The number after the "HD" represents the hamming distance, or the highest number of faulty bits in a frame that can be detected with 100% probability. For the various CRC and decisions algorithm pairings shown in FIG. 3, the failure rate of the SPI for 20 sensor samples is below the embodiment ASIL D/100 failure rate of $10^{-10}$ for bit error rates of less than $10^{-3}$. Therefore, in one embodiment, the received bit error rate is monitored, and airbag firing is disabled when the monitored error rate exceeds $10^{-3}$.

It should be appreciated that the CRC-decision algorithm pairings, bit error rate limits, number of repeated sensor measurements, and other parameters are only examples of embodiment system configurations. In alternative embodiments, different CRC-decision algorithm pairings, bit error rate limits, number of repeated sensor measurements, and other parameters can be used according to the target system and its requirements.

In one embodiment, the time to recognize a failure probability of $10^{-3}$ is longer than 5 ms, for a system with two satellite sensors (2 transmissions*32 Bit per transmission/500 μs sampling rate of the satellites sensors=128 kBit/s). Here, at least 640 bits are transmitted within 5 ms for system that has only 2 side satellite sensors connected to the bus. If the probability of a fault is $10^{-3}$, the mean time between 2 adjacent bit errors is about 8 ms. Since this is a 1σ sigma value, an observation time of n*8 ms can be used to make sure that the system is not running with an unacceptable bit failure probability above $10^{-3}$ with a certainty of nσ. In this case, the observation time is roughly 100 ms for 126 certainty and a corresponding failure rate of approximately $10^{-6}$. The system deactivates the airbag for 100 ms after each detected failure and then monitors incoming bit errors to make sure that a second failure does not occur in this period to make sure that the bit error probability is still in a safe range.

In an embodiment, to avoid long times during which the airbag system is disabled, the received data rate is artificially increased during the deactivation period by reading configuration register data that is known to the microcontroller. By increasing the data rate to an available maximum of e.g. 2 MBit/s which is roughly a factor of 8 times the normal received data rate, the airbag deactivation time can be reduced to at least 12.5 ms, which represents a maximum delay added to a firing decision time after a failure is detected. In alternative embodiments, other certainty factors, delay times, maximum data rate, and data rate increase factors can be used.

Figure 4:
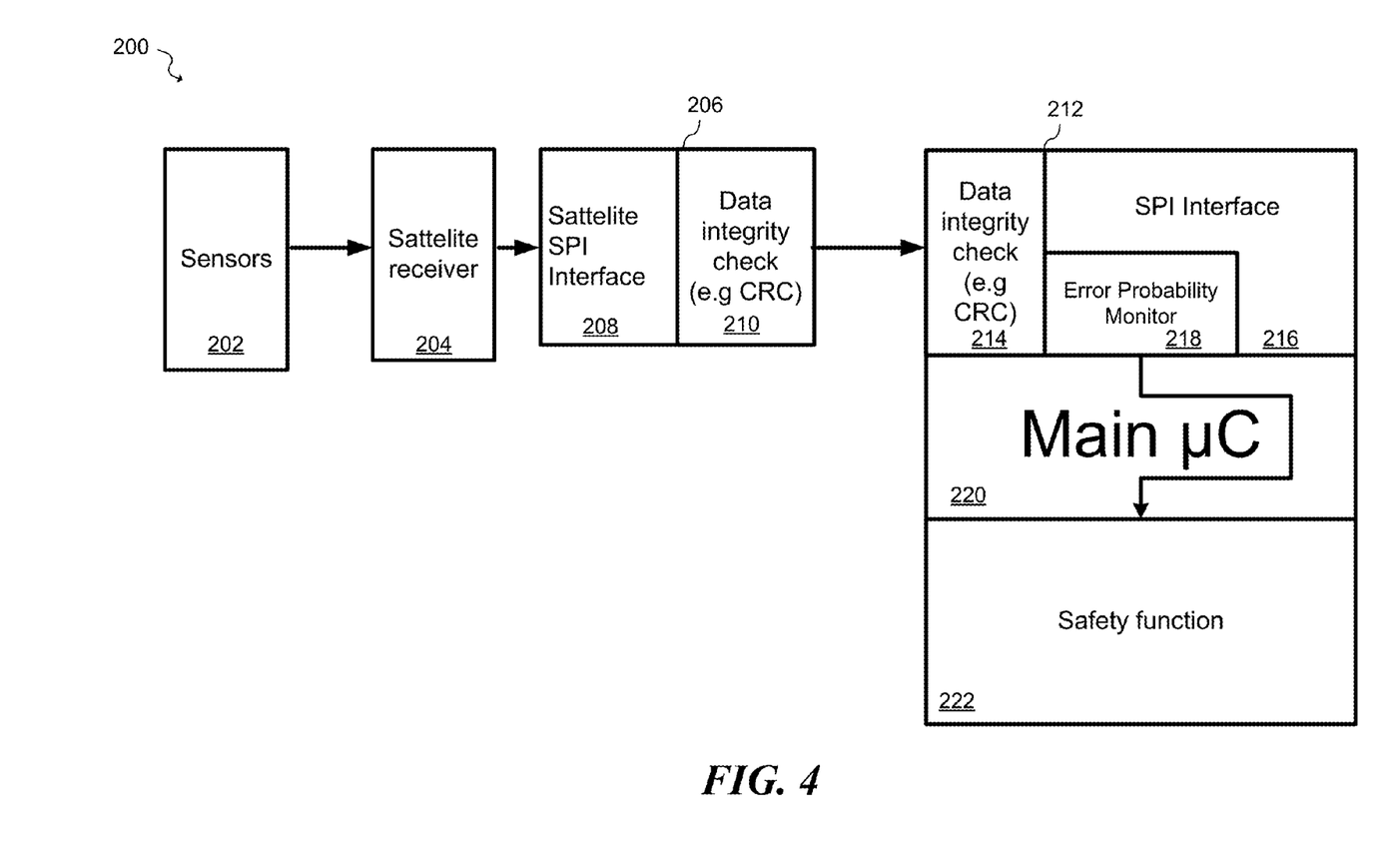
FIG. 4 illustrates an embodiment safety function system.

FIG. 4 illustrates embodiment safety function system 200. Remote sensors 202 are coupled to satellite receiver 204, which forwards data to satellite interface 206 having SPI interface 208 and data integrity check function 210. In one embodiment, the data integrity check function 210 uses a CRC. Alternatively, other interface types besides SPI and other data integrity check functions, such as Hamming codes, can be used. Sensor data, along with a data integrity check filed in broadcast over SPI bus 224 and is received by SPI interface 216 within airbag processor 212. The incoming data and its data integrity check field is used by data integrity check block 214 to determine whether or not the received data block has a transmission error. In one embodiment, this is done by verifying that the sensor data field is consistent with the data integrity check field, for example, a CRC field, is consistent. If the sensor data is consistent with the data integrity field, it is forwarded to safety function 222. If, on the other hand, an error is detected, error probability monitor 218 uses the detected error to estimate a received error rate and determines whether or not the safety function is enabled, disabled, or re-enabled. In some embodiments, main microcontroller 220 implements decision algorithms. In further embodiments, main microcontroller 220 also implements CRC check and error probability functions, and executes self-test and test routines to monitor other system components.

In an embodiment, error probability monitor 218 determines a variable that is related to the received bit error rate. From the measured bit error rate related variable, it is determined whether the actual received bit error rate is above or below a tolerable bit error value, for example $10^{-3}$. If the measured received bit error rate is above this tolerable value, the safety function, (i.e. airbag firing) is disabled. In some embodiments, the variable related to the received bit error rate is compared to a threshold.

Figure 5A:
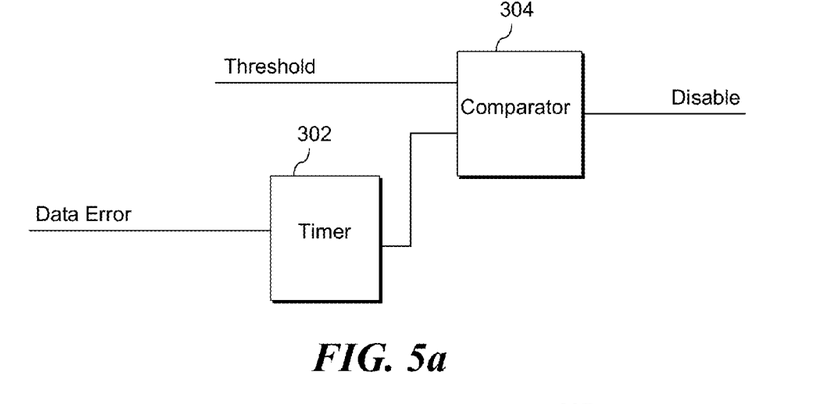
FIG. 5a-5c illustrate embodiment error probability monitors.
Figure 5B:
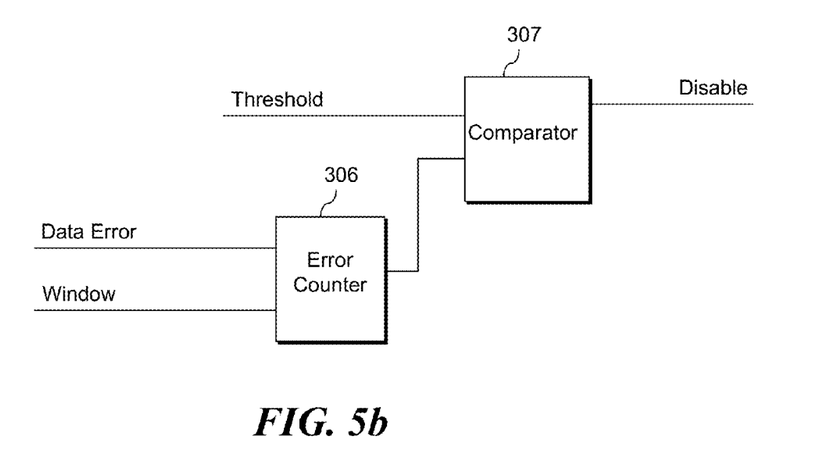
Figure 5C:
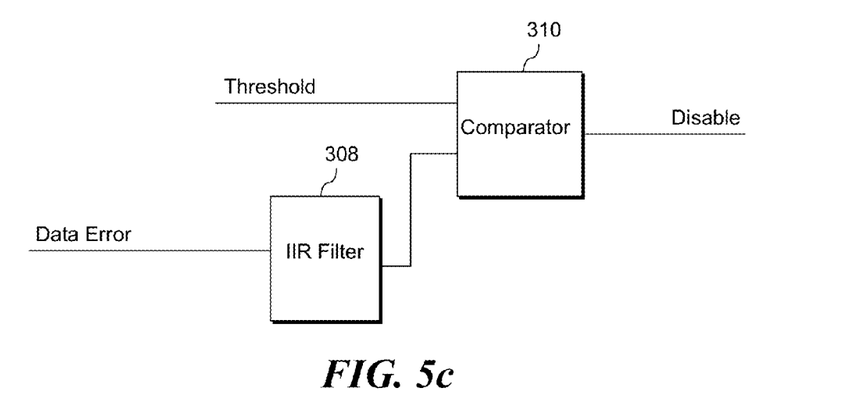

FIGS. 5a-5c illustrate embodiment error probability monitors. In FIG. 5a, timer 302 monitors the time between two consecutive occurrences of data errors detected by the data integrity checker, and comparator 304 determines if the time between two consecutive error occurrences is lower than a threshold. If comparator 304 determines that the time between two consecutive errors is lower than the threshold, the safety system is disabled.

In FIG. 5b, error counter 306 monitors a number of error occurrences within a predetermined time window, and comparator 307 determines if the number of error occurrences within the predetermined time window is greater than a threshold. If comparator 307 determines that the number of error occurrences within the predetermined time window is greater than the threshold, the safety system is disabled.

In FIG. 5c, IIR filter 308 filters occurrences of data errors with respect to time, and comparator 310 compares the output of IIR filter 308 with a threshold. In an embodiment, IIR filter 308 is a low pass filter that is fed with a logic "zero" in the case of a transmission without a detected error and with a logic "one" in case of a detected error. Alternatively, other values representing detected errors can be input to IIR filter 308. If comparator 307 determines that the output of IIR filter 308 is greater than a threshold, the safety system is disabled. The threshold to initiate a safety measure is given by the number of tolerable transmission errors within the filter time constant. In an embodiment, the timers, counters, comparators and filter of FIGS. 5a-5c are implemented using hardware and/or software techniques known in the art.

Figure 6A:
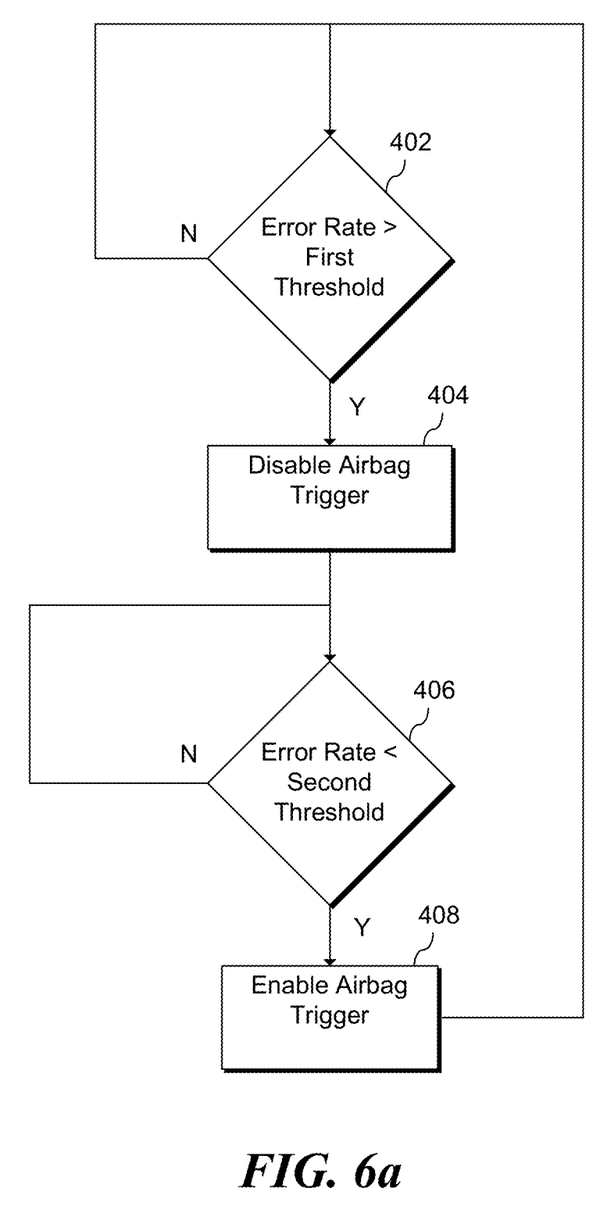
FIGS. 6a-6c illustrate flow charts of embodiment methods.
Figure 6B:
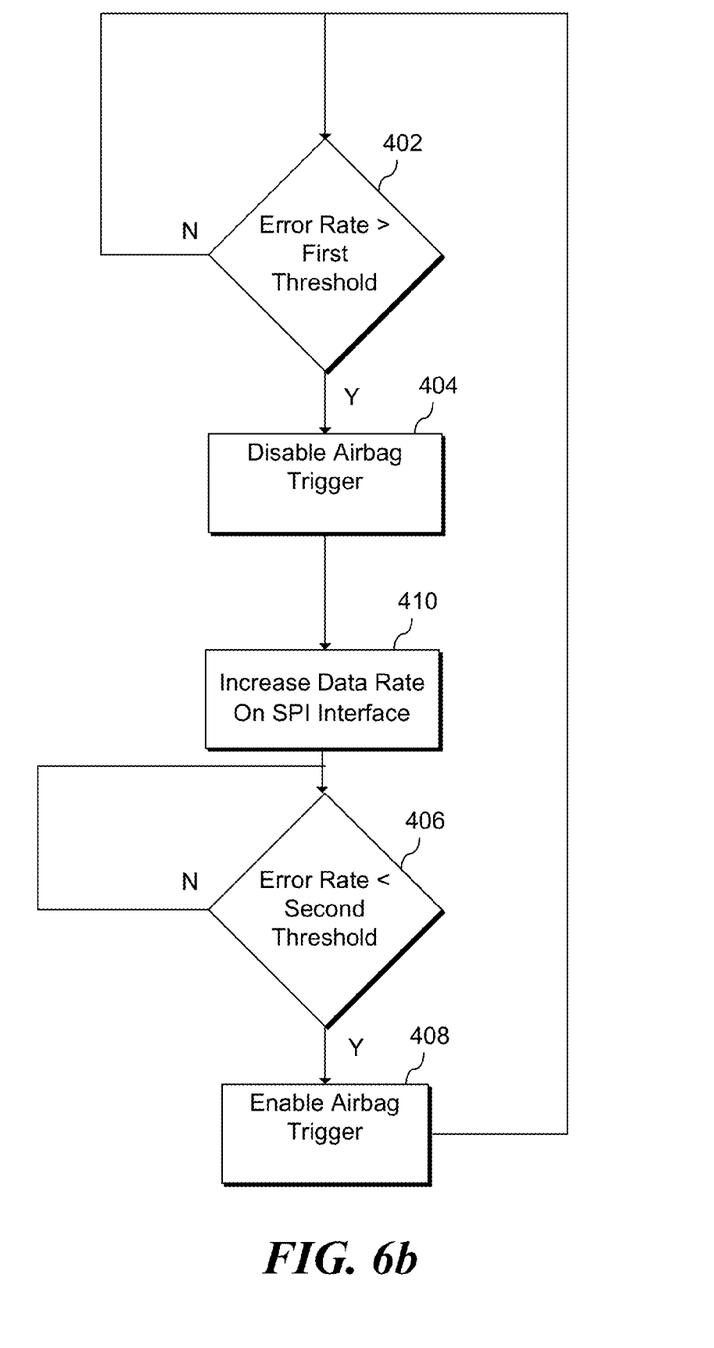
Figure 6C:
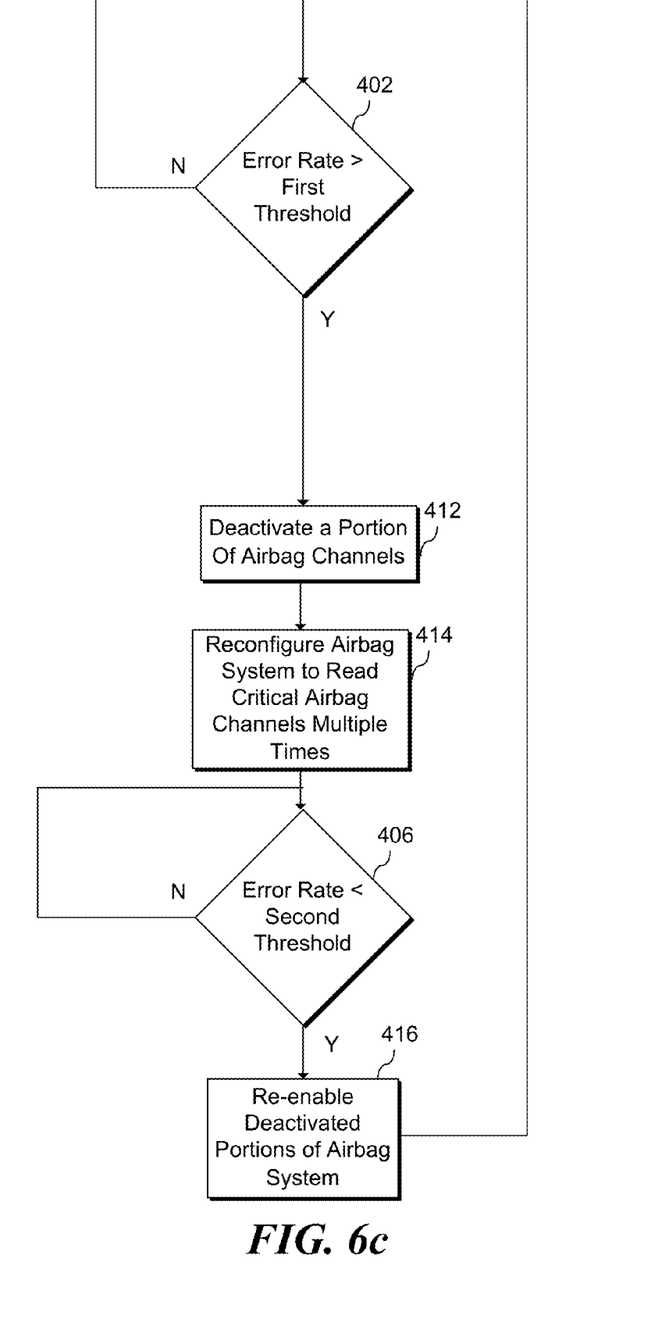

In some embodiments, once the safety measure trigger has been deactivated, the system can be re-enabled under certain conditions, for example, when the measured error rate falls back into a safe range. Methods illustrating the re-enablement of safety measures are illustrated in FIGS. 6a-6c. While the methods outlined in these Figures address an airbag system, it should be appreciated that embodiment methods can be applied to other types of safety systems, and to other system types, as well.

FIG. 6a illustrates a flow chart of an embodiment method. In step 402, the measured error rate is compared to a first threshold. As long as the error rate is less than the first threshold, the safety system is enabled. Once the measured error rate exceeds the first threshold, the safety measure trigger is disabled in step 404. When the system has been disabled, the error rate is compared with a second threshold. If the error rate is less than the second threshold, as detected in step 406, the safety system is re-enabled in step 408, and the error rate is once again compared with the first threshold in step 402. In some embodiments, the first threshold is the same as the second threshold. In other embodiments, the first and second thresholds are different. In some embodiments, the second threshold is less than the first threshold in order to sharpen the re-enablement criterion. In such cases, hysteresis is introduced so that the error level to re-activate the air bag is lower than the original deactivation threshold. In some embodiments, the reactivation threshold is a factor of about five times lower than the deactivation threshold. For example, in an embodiment where the deactivation threshold corresponds to a measured error rate of about $10^{-3}$, the re-activation threshold is about $2\times10$. In alternative embodiments, other activation and reactivation thresholds can be used.

In a further embodiment, the data rate of the sensor system is increased after the system has been deactivated in order to reduce the amount of time the safety system is disabled before verifying that the measured error probability has re-entered a safe range. The method illustrated in the block diagram of FIG. 6b is similar to the method illustrated in FIG. 6a with the addition of step 410 that occurs after the safety system is disabled in step 404. In step 410, the data rate on the SPI interface is increased, for example, by increasing the sensor data rate. In a further embodiment, the sensor data rate is increased by transmitting known values during all normal transmission gaps between the measurements from the sensors with known values. By transmitting values over transmission gaps, the time window needed to verity the error probability criterion is reduced. Also, by transmitting known values, the probability of detecting errors is increased. Here the probability of detecting errors approaches 100%, which exceeds the probability of detection offered, for example by CRC having a small polynomial such as a three-bit CRC appended to a 32-bit message. In such embodiments, the transmitted values are known both to the microcontroller and to the sensor interface. In some embodiments, these known values are stored on the sensor interface and can be present in configuration data written from the microcontroller into the sensor interface.

In a further embodiment, the airbag system is not disabled and the number of sensor samples are increased in order to reduce the effective error rate. For example, every measurement can be transmitted two or more times from each sensor. In such embodiment, sufficient channel capacity is needed to accommodate the increased transmission rate.

In a further embodiment, only a portion of the sensor channels are disabled, leaving critical channels to be monitored until the measured error rate falls back into a safe range. Such an embodiment increases the data rate before the system is fully re-enabled, but allows more critical portions of the system to remain on because the probability to detect transmission errors is increased by the potency of the number of repetitions.

FIG. 6c illustrates an embodiment method in which portions of the airbag system or other safety system are disabled in step 412 after the error rate exceeds the first threshold in step 402. After deactivating a portion of the sensor channels, the safety system is reconfigured to measure a subset of the sensor channels multiple times in step 414. For example, in one embodiment, the front and side airbags remain enabled, and other airbags such as the knee airbags and rollover airbags are disabled. Here, the data rate of the most critical sensor channels is increased, while the least critical sensor channels are disabled. Alternatively, other criteria, such as power consumption, can be used to determine which systems remain functional and which systems are shut down. When the measured error rate reaches a safe value, the deactivated portions of the system are re-enabled in step 416. In some embodiments, the disabling and re-enabling portions of the airbag or other safety system can be done in multiple stages, where the number of deactivated portions corresponds to different measured data error rates. In some embodiments, safety functionality is maintained in systems that have limited channel capacity. In systems that have higher channel capacity, the data rate of all sensor channels can be increased without shutting down the system if the error rate of the sensor channels can be kept in a safe range.

In an embodiment, a method of determining whether to trigger an event based on data blocks having status data of a monitored process (e.g. sensor data) includes electronically receiving the data blocks over a channel, performing a data integrity check on the data blocks to determine whether a particular data block has a transmission fault, calculating a received error metric based on performing the data integrity check, and disabling an event trigger if the received error metric crosses a first error threshold. In an embodiment, the method also includes triggering the event if the sensor data meets an event trigger criterion, and if the event trigger is not disabled. In some embodiments, the status data represents outputs of sensors, and triggering the event comprises triggering an air bag. In some embodiments, the method also includes enabling the event trigger after the event trigger has been disabled if the received error metric is less than a second error threshold. In one example, wherein the second error threshold is less than the first error threshold. In some embodiments, the data blocks include cyclic redundancy check (CRC) fields, and performing the data integrity check includes performing a CRC check. In some embodiments, calculating the received error metric comprises counting transmission faults within a defined time window, and wherein the received error metric comprises a number of transmission faults within a specified time window. In further cases, received error metric comprises determining a time between two transmission faults, or filtering occurrences of transmission faults with respect to time.

In an embodiment a method of determining whether to trigger an event based on sensor data blocks includes receiving sensor data blocks over an interface, performing a data integrity check on the sensor data blocks to determine whether a particular sensor data block has a transmission fault, calculating a received error metric based on performing the data integrity check and disabling an event trigger if the received error metric exceeds a first error threshold. In an embodiment, the method also includes triggering the event if the sensor data meets an event trigger criterion, and if the event trigger is not disabled, and/or re-enabling the event trigger after disabling the event trigger if the received error metric decreases below a second error threshold. In some cases, the second error threshold is less than the first error threshold.

In an embodiment, the method also includes increasing a data rate of the sensor data blocks after disabling the event trigger from a first data rate to a second data rate in order to reduce a time in which the event trigger is re-enabled. In some embodiments, the event includes deploying am airbag in an automotive system.

In an embodiment, a method of determining whether to deploy an airbag based on sensor data blocks includes receiving sensor data blocks over an interface, performing a data integrity check on the sensor data blocks to determine whether a particular sensor data block has a transmission fault, calculating a received error metric based on performing the data integrity check, disabling airbag deployment if the received error metric exceeds a first error threshold, and re-enabling the airbag deployment after disabling the airbag deployment if the received error metric decreases below a second error threshold. In an embodiment, the method also includes deploying the airbag if the sensor data blocks meet airbag deployment criteria. In some embodiments, the method also includes increasing a data rate of the sensor data blocks from a first data rate to a second data rate after disabling the airbag deployment in order to reduce a time in which the airbag deployment is re-enabled. In one example, increasing the data rate of the sensor data blocks includes reading airbag sensor channels multiple times.

In some embodiments, the method also includes deactivating a first subset of airbag sensor channels dedicated to a first subset of airbags, and increasing a data rate of a second subset of airbag sensor channels dedicated to a second subset of the airbags.

In an embodiment, a system for triggering an event based on sensor data includes a reception interface configured to be coupled to a sensor transmission channel and configured to receive sensor data blocks. The system also includes a data integrity check block configured to determine if the sensor data blocks contain data errors, and an error probability monitor configured to determine a received error metric based on data errors detected by the data integrity check block. The system also has an event triggering block configured to disable an event trigger if the received error metric is greater than a first a first error threshold, re-enable the event trigger if the received error metric falls below a second error threshold after the event trigger has been disabled, and trigger the event if the sensor data blocks meets event triggering criteria, and if the event trigger is enabled. In some embodiments, the event includes firing an airbag in an airbag system. Alternatively, other events can be triggered.

In some embodiments, data integrity check block performs a cyclic redundancy check (CRC), however, other data checking schemes can be used. In some case the error probability monitor includes a counter that captures a time between two detected data errors and/or an error counter that monitors a number of detected data errors within a defined time window. Alternatively, the error probability monitor includes an IIR filter filters that detects data errors.

In an embodiment, a method of determining whether to trigger an event based on sensor data blocks includes receiving sensor data blocks over an interface from a plurality of sensors, performing a data integrity check on the sensor data blocks to determine whether a particular sensor data block has a transmission fault, calculating a received error metric based on performing the data integrity check, and increasing a transmission rate of a first of the plurality of sensors based on the received error metric. In an embodiment the method also includes disabling a second of the plurality of sensors based on the received error metric. In some embodiments, the first of the plurality of sensors is associated with a high priority sensor, and the second of the plurality of sensors is associated with a low priority sensor.

An advantage of embodiments include compatibility with system components that only use CRC checking without calculating a received data error metric. For example, such system components may include other sensors on the SPI bus that have no ASIL D requirement, or systems that are retrofit into older airbag systems. A further advantage includes the ability to maintain a high safety integrity level using a smaller CRC polynomial, thereby making more bandwidth available for sensor data.

A further advantage of some embodiments includes the ability to implement embodiment safety system strategies in legacy systems without the need to redefine existing tested and verified SPI protocols. In such embodiments, normal operation proceeds according to existing protocols, and the error performance is monitored. Another advantage of embodiments includes the ability to apply embodiment systems and methods to channels and data busses that do not have a known channel error statistic. Here, the embodiment system assumes that the a data bus or transmission channel operates with a sufficiently low bit error probability, and the system makes sure that the actual bit error probability is safely below a tolerable limit with a sufficient margin, for example, 10 sigma. If the monitoring indicates that the error probability is no longer in the safe range safety measures are taken, for example, deactivating an airbag system until the measured error probability returns to a safe range.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system comprising:
  a control unit configured to be coupled to a sensor, the control unit configured to:
    electronically receive data blocks from the sensor;
    perform a data integrity check on the data blocks to determine whether a particular data block has a transmission fault;

calculate a received error metric based on performing the data integrity check, the received error metric comprising a received error rate; and disable an event trigger if the received error metric crosses a first error threshold, wherein the control unit is further configured to enable the event trigger after the event trigger has been disabled if the received error metric is less than a second error threshold, wherein the second error threshold is less than the first error threshold.

2. The control unit of claim 1, wherein the control unit is further configured to trigger an event if the data blocks have status data that meets an event trigger criterion, and if the event trigger is not disabled.

3. The control unit of claim 2, wherein:
the status data represents an output of the sensor; and
triggering the event comprises generating an air bag firing signal.

4. The control unit of claim 1, wherein the data blocks comprise cyclic redundancy check (CRC) fields, and wherein performing the data integrity check comprises performing a CRC check.

5. The control unit of claim 1, wherein calculating the received error metric comprises counting transmission faults within a defined time window, and wherein the received error metric comprises a number of transmission faults within a specified time window.

6. The control unit of claim 1, wherein calculating the received error metric comprises determining a time between two transmission faults.

7. The control unit of claim 1, wherein calculating the received error metric comprises filtering occurrences of transmission faults with respect to time.

8. The control unit of claim 1, wherein the control unit is configured to receive the data blocks over a plurality of channels configured to be coupled to a plurality of sensors.

9. The control unit of claim 1, wherein the control unit is further configured to generate a control signal to increase a data rate of the data blocks after disabling the event trigger.

10. A system for triggering an event, the system comprising:
an input interface configured to receive data blocks from a sensor;
a data integrity check circuit configured to determine if the data blocks contain data errors;
an error monitor configured to determine a received error metric based on data errors detected by the data integrity check circuit; and
an event triggering circuit configured to:
disable an event trigger if the received error metric is greater than a first error threshold,
enable the event trigger if the received error metric is below a second error threshold, wherein the second error threshold is less than the first error threshold, and
trigger the event if the data blocks meet event triggering criteria, and if the event trigger is enabled.

11. The system of claim 10, wherein the event comprises firing an airbag in an airbag system.

12. The system of claim 10, wherein the data integrity check circuit performs a cyclic redundancy check (CRC).

13. The system of claim 10, wherein the error monitor comprises a counter that captures a time between two detected data errors.

14. The system of claim 10, wherein the error monitor comprises an error counter that monitors a number of detected data errors within a defined time window.

15. A safety system comprising:
an interface circuit configured to be coupled to a plurality of sensors,
an internal data bus coupled to the interface circuit,
a trigger circuit coupled to the internal data bus and configured to be coupled to a safety device, wherein the trigger circuit is configured to detect an event based on sensor data received on the internal data bus and to trigger the safety device, and
a data integrity circuit coupled to the internal data bus and the trigger circuit, wherein the data integrity circuit is configured to calculate an error metric corresponding to the sensor data received on the internal data bus and disable the trigger circuit if the error metric is above a first error threshold.

16. The safety system of claim 15, further comprising the plurality of sensors and the safety device, wherein the safety device comprises an air bag and triggering the safety device comprises firing the air bag.

17. The safety system of claim 15, further comprising an internal sensor coupled to the internal data bus and configured to sense acceleration.

18. The safety system of claim 15, wherein the data integrity circuit comprises a safety integrity check circuit and a safing drive circuit configured to enable or disable the trigger circuit based on a control signal from the safety integrity check circuit.

19. The safety system of claim 18, wherein the error metric is calculated by:
performing a data integrity check on data blocks in the sensor data received over the internal data bus in order to determine whether a particular data block has a transmission fault; and
calculating the error metric based on performing the data integrity check.

* * * * *